Jan. 23, 1962  R. A. LANCASTER  3,018,020
ARTICLE STORAGE AND DISPENSING APPARATUS
Filed Dec. 19, 1958  2 Sheets-Sheet 1
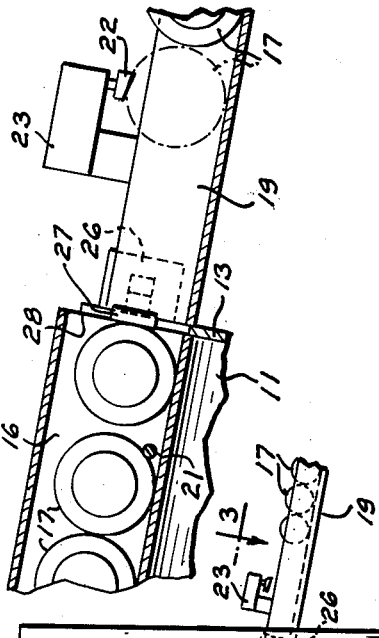
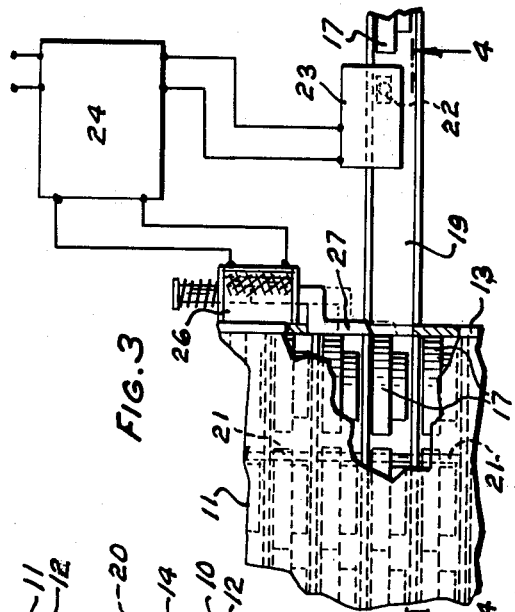
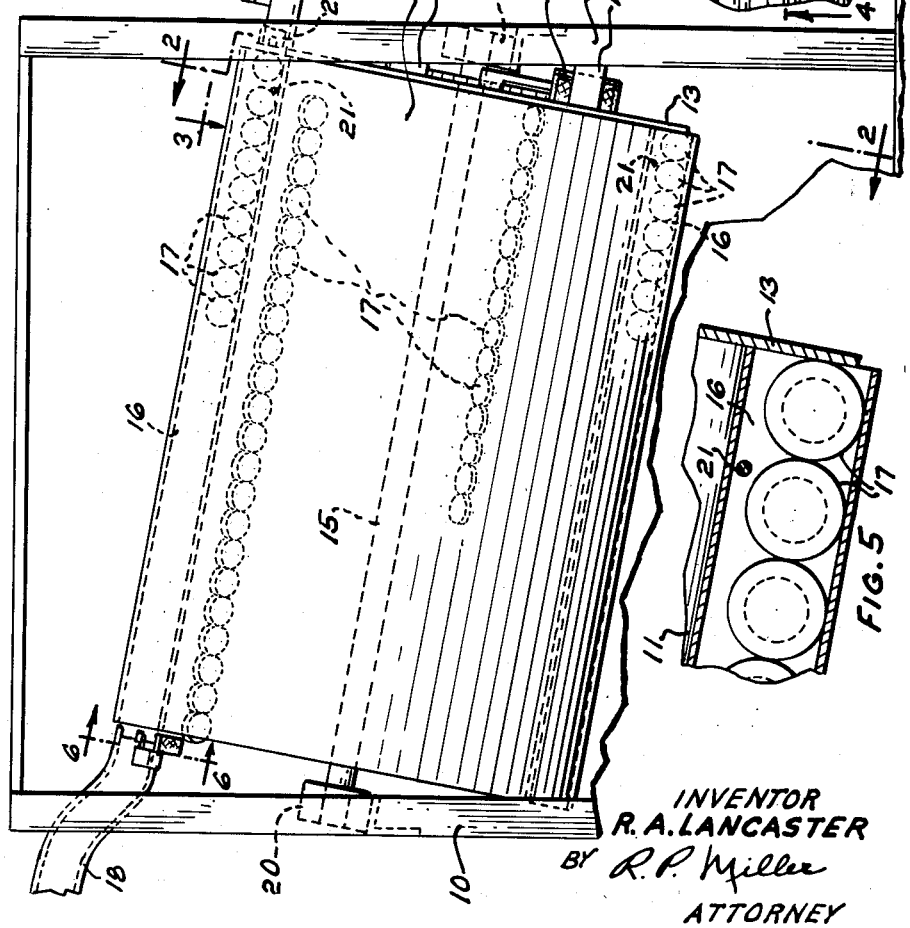
INVENTOR
R. A. LANCASTER
BY R. P. Miller
ATTORNEY Jan. 23, 1962 R. A. LANCASTER 3,018,020
ARTICLE STORAGE AND DISPENSING APPARATUS
Filed Dec. 19, 1958 2 Sheets-Sheet 2
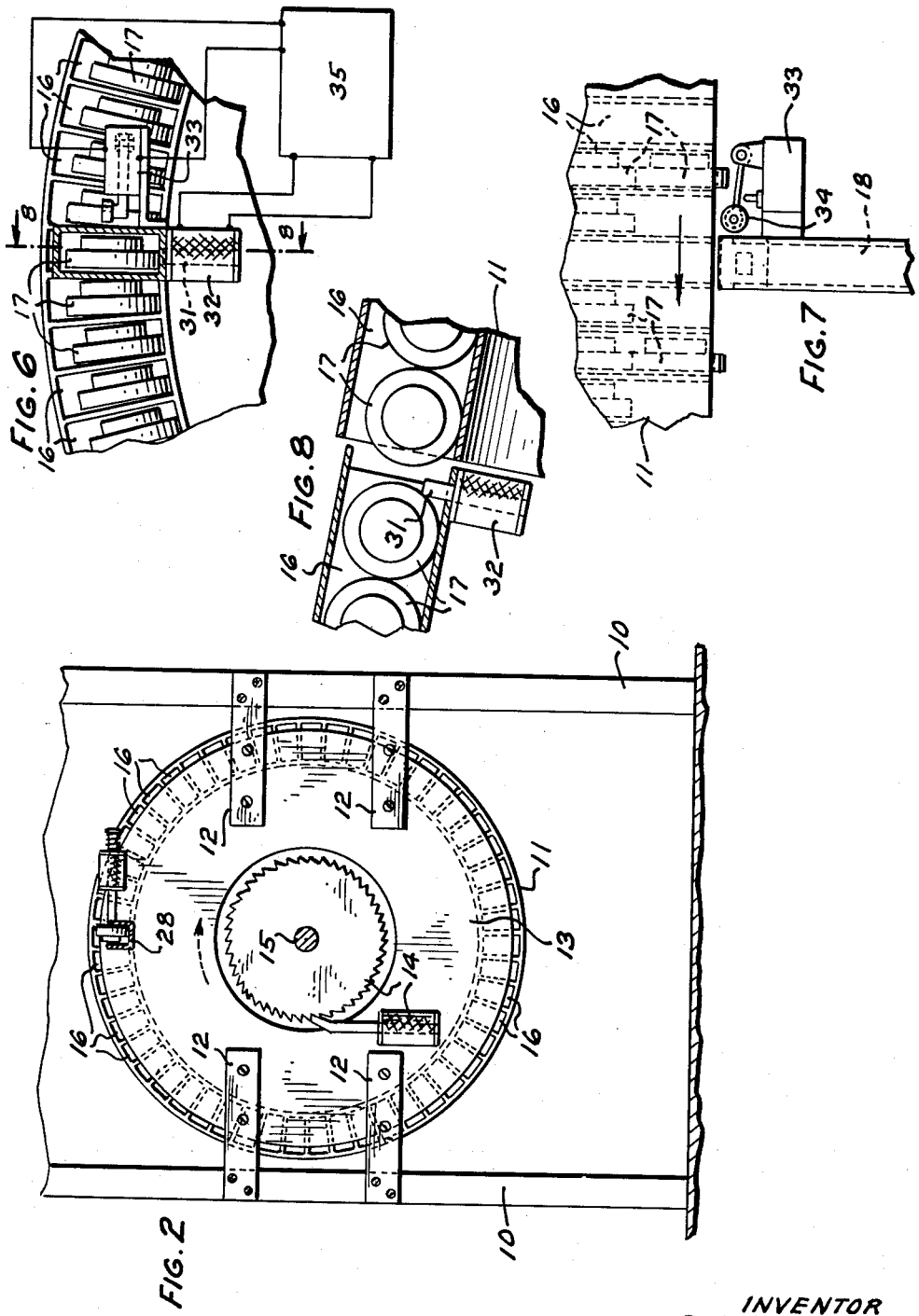
INVENTOR
R. A. LANCASTER
BY
ATTORNEY

United States Patent Office 3,018,020
Patented Jan. 23, 1962

3,018,020
ARTICLE STORAGE AND DISPENSING
APPARATUS
Robert A. Lancaster, Indianapolis, Ind., assignor to Western Electric Company, Incorporated, New York, N.Y., a corporation of New York
Filed Dec. 19, 1958, Ser. No. 781,620
12 Claims. (Cl. 221—10)

This invention relates to an article storage and dispensing apparatus and more particularly to a rotatably mounted article-storage drum provided with a plurality of receiving magazines evenly spaced about the periphery thereof for dispensing articles in a predetermined manner.

Uninterrupted dispensation of articles is essential in numerous manufacturing processes; consequently, it is desirable to provide a continuous source of supply and eliminate random stock piling and costly handling of articles. In attempting to solve difficulties of this nature, which continually arise, numerous hopper and feed devices have been developed. However, these various innovations have yet to purvey a simple, positive-acting dispensing mechanism that receives an ample supply of articles directly from an intermittent source, stores the articles, and dispenses same at an even rate in a utilization position.

It is a prime object of this invention to provide a new and improved article storage and dispensing apparatus.

An additional object of the invention resides in an article-storage device having facilities for receiving articles from an intermittent source and delivering the articles at a uniform rate.

It is a further object of this invention to provide a plurality of receiving magazines evenly spaced about the periphery of a rotatably mounted drum for storing a supply of articles.

Another object of this invention is to provide a storage and dispensing apparatus with stops positioned within a plurality of storage magazines to prevent the discharge of more than one article at a time.

Still another object of this invention is to provide the supply and discharge chutes of a storage drum with restrictive gates whereby any jamming of articles being received or dispensed is precluded.

With these and other objects in view, the present invention contemplates a drum provided with a plurality of peripherally located magazines and rotatably mounted on an incline within a frame or supoprting structure. The drum is cyclically indexed in order that each successive storage magazine is brought into alignment with supply and discharge chutes simultaneously. A magazine that has been brought into the above-described alignment is prepared to receive and discharge articles; however, the discharge of only one article at a time from each magazine is generally desirable and is insured by a stop positioned therein. The remaining magazines are prevented from dispensing any articles by a retaining plate stationarily mounted on the supporting structure. The retaining plate is provided with a single egress positioned to allow the passage of articles to the aforementioned discharge chute. If either a magazine or the discharge chute should become full, restrictive gates are actuated to prevent any jamming that might occur; however, the timed cycling operation is not rendered ineffective by this action, and the drum continues to rotate.

Other objects and advantages of the present invention will be apparent from the following detailed description when considered in conjunction with the accompanying drawings wherein:

FIG. 1 is a side view of a storage and dispensing apparatus embodying the principles of the present invention;

FIG. 2 is a view taken along the line 2—2 of FIG. 1 and which generally illustrates an indexing mechanism;

FIG. 3 is a fragmentary plan view partially in section illustrating instrumentalities which preclude the jamming of articles within the dispensing chute;

FIG. 4 is a sectional view taken along the line 4—4 of FIG. 3 further illustrating a magazine in alignment with the dispensing chute;

FIG. 5 is an enlarged fragmentary sectional view illustrating a magazine of the apparatus depicted of FIG. 1 in a position to permit the passage of an article past a stop;

FIG. 6 is a view taken along the line 6—6 of FIG. 1 illustrating a mechanism which precludes jamming of the article being advanced to the magazines;

FIG. 7 is a plan view of the same mechanism illustrated in FIG. 6; and

FIG. 8 is a view taken along the line 8—8 of FIG. 6 further illustrating the anti-jamming mechanism in an actuated position.

Referring to FIGS. 1 and 2, there is disclosed a drum 11 secured to a shaft 15. The drum and shaft are rotatably mounted on an incline within bearings 20 of a frame or supporting structure 10. The frame 10 supports a number of braces 12 to which is secured a retaining plate 13. An indexing mechanism of a well-known type generally designated by the numeral 14 is mounted on the plate 13 and the shaft 15 and provides for timed cycling of the drum.

A plurality of magazines 16 are uniformly and successively spaced circumferentially about the drum and extend the entire length thereof. These magazines are utilized as storage areas for circular articles 17 being fed from a supply chute 18 to a discharge chute 19. The inclined mounting of the drum results in a continuous urging of the circular articles 17 toward the retaining plate 13 and a stop or abutment 21 positioned within each magazine. These stops 21 insure the discharge of only one article at a time when positioned a distance equal to approximately one article diameter from the discharge end of each magazine. Should the discharge of several articles from each magazine be desired, the stop or abutment may be accordingly repositioned a distance equal to several diameters from the discharge end of each magazine. Further, it may be desired to dispense different numbers of articles from the several magazines in which situation the stops will be positioned at different distances.

Referring now to FIGS. 3 and 4, a switch actuator 22 is shown positioned in the path of the circular articles 17 advancing within the chute 19. Should the dispensed articles 17 tend to stack up within the chute 19, the switch actuator 22 will be depressed, resulting in the closing of a switch 23 for a prolonged interval of time. A time-delay device 24 of a well-known type is in turn rendered effective and energizes a solenoid 26 that functions to advance a gate 27 across an egress 28 formed in the retaining plate 13.

Similarly, a gate 31 is provided to preclude jamming at the receiving end of the drum 11 (FIGS. 6, 7 and 8). As the drum is indexed, the magazines pass from right to left across the mouth of the supply chute 18 as illustrated in FIG. 7. The advancement of a full magazine will bring a protruding portion of an article 17 into engagement with the switch arm 34. A resulting energization of a solenoid 32 through the cooperation of a switch 33 and a time-delay device 35 will advance the gate 31 to prevent further passage of articles from the supply chute.

*Mode of operation*

Articles are passed from a supply chute 18 into a plurality of magazines 16 of a drum 11. As each successive magazine is positioned in alignment with the single egress 28 formed in the retaining plate, an article under the influence of gravity will pass into the discharge chute 19. Each article operates the switch 23 but not for a sufficient length of time to operate the time-delay device 24. Passage of more than one article 17 from the magazine will be precluded by the stop 21. As the drum 11 continues to rotate, the parts 17 will eventually move from engagement with the bottom wall and into engagement with the top wall of each magazine. Due to the inclined mounting of the drum, parts will freely move under the stop 21 into engagement with the retaining plate 13. Continued rotation of the drum will present this newly positioned article to the egress 28.

Should the discharge chute, which is feeding articles to an assembly position become full, the switch 23 will be held closed a sufficient period of time to permit the time-delay device 24 to function and as a result, the gate 27 will be actuated precluding any further passage of articles into the chute 19. The drum will continue to rotate in order that articles may be received from the supply chute 18. Upon clearance of the discharge chute 19, the gate 27 will be returned to its former position and articles will again be freely dispensed. In a similar manner, the gate 31 will be actuated to prevent any further passage of articles from the supply chute upon ascertainment of full magazines.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. A device which receives an intermittent supply of articles and dispenses said articles at a constant rate comprising a storage means, means for mounting said storage means on an incline, said mounting means having supply and discharge chutes secured thereto, normally ineffective gate means within the chutes for allowing the advancement of articles in said chutes, means responsive to the last article in the filled storage means for operating the gate means in the supply chute to render said gate means effective, and means responsive to the filling of the discharge chute with articles for operating the gate means in the discharge chute to render said gate means effective.

2. An article-dispensing apparatus comprising an open-ended inclined magazine, an inclined plate cooperable with said magazine for retaining articles therein, said plate having an aperture formed in the upper portion thereof, means for rotating said magazine about an axis parallel to the length of said magazine to cyclically present the magazine to said aperture, and a stop member secured within the magazine at a predetermined distance from an open end thereof and at a predetermined distance from one side of said magazine.

3. An article storage and dispensing apparatus comprising a frame, a drum rotatably mounted on an incline within said frame and having a plurality of magazines positioned about the periphery thereof, a retaining plate stationarily secured to said frame having a single aperture formed therein, drum-indexing means mounted on said retaining plate for cycling said magazines successively into alignment with said aperture, and stop means positioned within each magazine to preclude passage of more than one article through said aperture.

4. In an article storage and dispensing apparatus, a supporting structure, a drum rotatably mounted on said supporting structure having a plurality of article-storage magazines uniformly positioned about the periphery thereof, means mounted on said supporting structure having a single egress formed therein for retaining articles in said magazines, means secured to said retaining means for cyclically indexing said drum, and stop means cooperable with said retaining means for selectively dispensing a predetermined number of articles as said magazines are successively cycled into alignment with said egress.

5. An article storage and dispensing apparatus comprising a plurality of open-ended inclined magazines, an inclined plate cooperable with said magazines for retaining articles therein, said plate having an aperture formed in the upper position thereof for passing articles being advanced by gravity from the uppermost magazine, means for rotating said magazines about an axis parallel to the length of said magazines to cyclically present the magazines to said aperture, and a stop member secured within each of said magazines at a predetermined distance from the lower open end thereof and at a predetermined distance from one side of each magazine for blocking the dispensation of all but a predetermined number of articles as each magazine is presented to the aperture.

6. An article-dispensing device comprising a frame, a drum rotatably mounted on an incline within the frame, a plurality of open-ended magazines longitudinally mounted on the inner periphery of the drum, a retaining plate juxtaposed to the lower end of the drum for holding the articles against movement from the magazines, said plate having a slot formed therein in the upper portion thereof in alignment with the uppermost magazine, means for cyclically advancing the drum to move each magazine into alignment with the slot, and a stop secured in each magazine for preventing movement of more than one article when a magazine is positioned in alignment with said slot, said stop being positioned to be passed by the articles as each magazine is rotated to the lowermost position.

7. An article storage and dispensing apparatus comprising a frame, a drum rotatably mounted on said frame having a plurality of article-receiving magazines positioned about the periphery thereof, means for rotating said drum, a supply chute stationarily positioned in alignment with said rotating magazines for presenting articles thereto, normally ineffective gate means within said supply chute, and means actuated by an article within a full magazine for rendering the gate means effective to block the advancement of articles from said supply chute.

8. In an article storage and dispensing mechanism, a supporting structure, a drum rotatably mounted on an incline within said supporting structure, a plurality of article-receiving magazines positioned circumferentially about said drum, a retaining plate having a single egress formed therein, a discharge chute securely mounted in alignment with said egress for receiving articles being dispensed by force of gravity from said inclined magazine, gate means secured to said discharge chute in juxtaposition with said egress, and means actuated by an article stacking up within said discharge chute for rendering the gate means effective to preclude further dispensation of articles.

9. In an article storage and dispensing apparatus, a supporting structure, a drum rotatably mounted on an incline within said supporting structure, said drum having a plurality of article-storage magazines uniformly positioned about the periphery thereof through which said articles intermittently gravitate, retaining means mounted on said supporting structure for preventing discharge of said articles from said magazines, said retaining means having a single egress formed therein, means stationarily secured to said retaining means for cyclically indexing said drum, means cooperable with said retaining means for selectively dispensing a predetermined number of articles as said magazines are successively cycled into alignment with said egress, a discharge chute securely mounted in alignment with said egress, gate means mounted on said discharge chute near said egress, and means actuated by an article within said discharge chute for rendering the gate means effective to preclude further gravitation of articles from said magazines to said discharge chute.

10. In an article storage and dispensing apparatus, a frame, an inclined drum rotatably mounted on said frame having a plurality of article-receiving and dispensing magazines positioned circumferentially about said drum, a retaining plate stationarily mounted on said frame for retaining said articles within said inclined magazines, said plate having a single egress formed therein, means secured to said retaining plate for cyclically indexing said drum to successively present said magazine to said egress, a supply chute stationarily positioned in alignment with said cycling magazines for presenting articles thereto, a first gate means secured to said supply chute in juxtaposition with said drum, means actuated by articles within a full magazine for rendering said first gate means effective to block the advancement of articles from said supply chute into said magazines, a discharge chute securely mounted in alignment with said egress for receiving articles which gravitate therethrough from said magazines, a second gate means secured to said discharge chute in juxtaposition with said egress, and means actuated by an article stacking up within said discharge chute for rendering said second gate means effective to preclude further gravitation of articles from said magazine to said discharge chute.

11. In a device for metering articles, an article holding means having an outlet, said means being inclined to allow gravitation of said articles therethrough, a stop member mounted in said means out of the path of gravitation of said articles therein, means having an egress positioned at the outlet for retaining said articles within said article holding means while said means is in a first position, and means for moving said article holding means to a second position to place said stop member within the path of gravitation of said articles and to align said egress with said outlet.

12. In a device for metering articles, an inclined magazine having an outlet through which said articles gravitate, a stop member mounted in said magazine above the path of gravitation of said articles, a plate mounted in juxtaposition with said outlet for retaining said articles within said magazine, said plate having an egress normally out of alignment with said outlet, and means for rotating said magazine to align said egress with said outlet and to position said stop member within the path of gravitation of said articles whereby said articles are restrained against further gravitational movement.

References Cited in the file of this patent

UNITED STATES PATENTS

| | | |
|---|---|---|
| 2,497,748 | Von Stoeser | Feb. 14, 1950 |
| 2,571,576 | Hopkins et al. | Oct. 16, 1951 |
| 2,745,537 | Cadman | May 15, 1956 |
| 2,863,546 | Josefowicz | Dec. 9, 1958 |
| 2,893,338 | Fiedler et al. | July 7, 1959 |